United States Patent [19]

Chao et al.

[11] Patent Number: 4,532,113
[45] Date of Patent: Jul. 30, 1985

[54] IRON CHLORIDE WASTE TREATMENT IN MOLTEN SALT

[75] Inventors: Tze Chao, Newark, Del.; Jack K. Nyquist, Chadds Ford, Pa.

[73] Assignee: E. I. Du Pont de Nemours and Company, Wilmington, Del.

[21] Appl. No.: 529,622

[22] Filed: Sep. 6, 1983

Related U.S. Application Data

[63] Continuation-in-part of Ser. No. 498,470, May 26, 1983, abandoned.

[51] Int. Cl.³ .................. C01F 11/24; C01G 49/02
[52] U.S. Cl. .................... 423/138; 423/155; 423/632; 423/DIG. 12; 423/633; 405/129
[58] Field of Search .............. 423/138, 155, DIG. 12, 423/80, 83, 86, 632, 633; 75/0.5 BA, 1 T, 39; 106/85; 405/129

[56] References Cited

U.S. PATENT DOCUMENTS

| | | | |
|---|---|---|---|
| 1,664,631 | 4/1928 | Koehler | 423/138 |
| 1,818,871 | 8/1931 | Seil | 423/138 |
| 4,120,360 | 10/1978 | Messenger | 106/85 |
| 4,142,912 | 3/1979 | Young | 106/98 |
| 4,229,399 | 10/1980 | Cole et al. | 264/117 |

FOREIGN PATENT DOCUMENTS 57-5632  4/1982  Japan .................................. 423/138

OTHER PUBLICATIONS

"Treatment of Spent Pickling Liquors with Limestone and Lime"—Hoak et al., Industrial and Engineering Chemistry, Jun. 1945, vol. 37, No. 6.

Primary Examiner—Earl C. Thomas
Assistant Examiner—Jeffrey E. Russel

[57] ABSTRACT

A process for treating iron chloride wastes such as those obtained when chlorinating titanium ore is disclosed. The process involves reacting the iron chlorides with limestone in molten $CaCl_2 \cdot xH_2O$, where x equals 3-6 and separating the resulting iron oxide from the molten $CaCl_2 \cdot xH_2O$.

7 Claims, 4 Drawing Figures

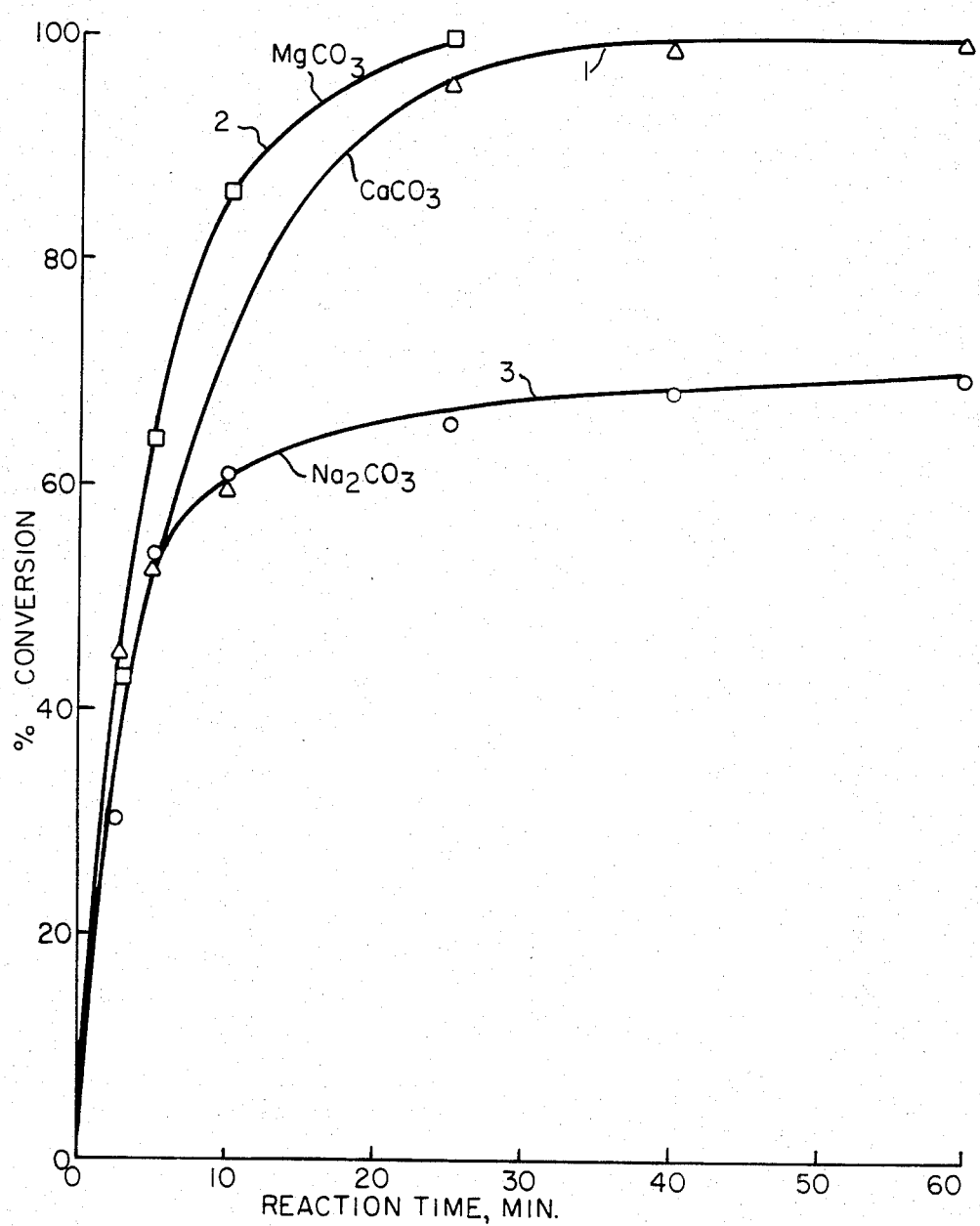

IRON CHLORIDE WASTE TREATMENT IN MOLTEN SALT

CROSS-REFERENCE TO RELATED APPLICATION

This application is a continuation-in-part of Ser. No. 498,470 filed May 26, 1983, now abandoned.

BACKGROUND OF THE INVENTION

1. Field of the Invention

The present invention relates to a process of treating iron chloride wastes such as those generated when chlorinating titanium ores or chlorinating aluminum ores to make them suitable for disposal, such as landfill.

2. Prior Art

U.S. Pat. No. 4,229,399 discloses mixing the iron chloride waste stream from a titanium ore chlorinator with an alkaline material and thereafter adding water and granulating the resulting mixture.

SUMMARY OF THE INVENTION

The present invention relates to a process of treating iron chloride wastes such as those generated in the chlorination of titanium ores to form titanium dioxide or chlorinating bauxite in the production of aluminum chloride and electrolytic aluminum. The process involves contacting the iron chloride wastes with limestone, dolomitic limestone, dolomite, or $MgCO_3$ in a bath of molten $CaCl_2 \cdot xH_2O$, where x is from 3-6, at from 50°-200° C., and preferably between 100°-150° C.

BRIEF DESCRIPTION OF THE DRAWINGS

FIG. 4 is a plot of % conversion vs. reaction time as described in Examples 11-13.

DETAILED DESCRIPTION OF THE DRAWINGS

Figure 1:
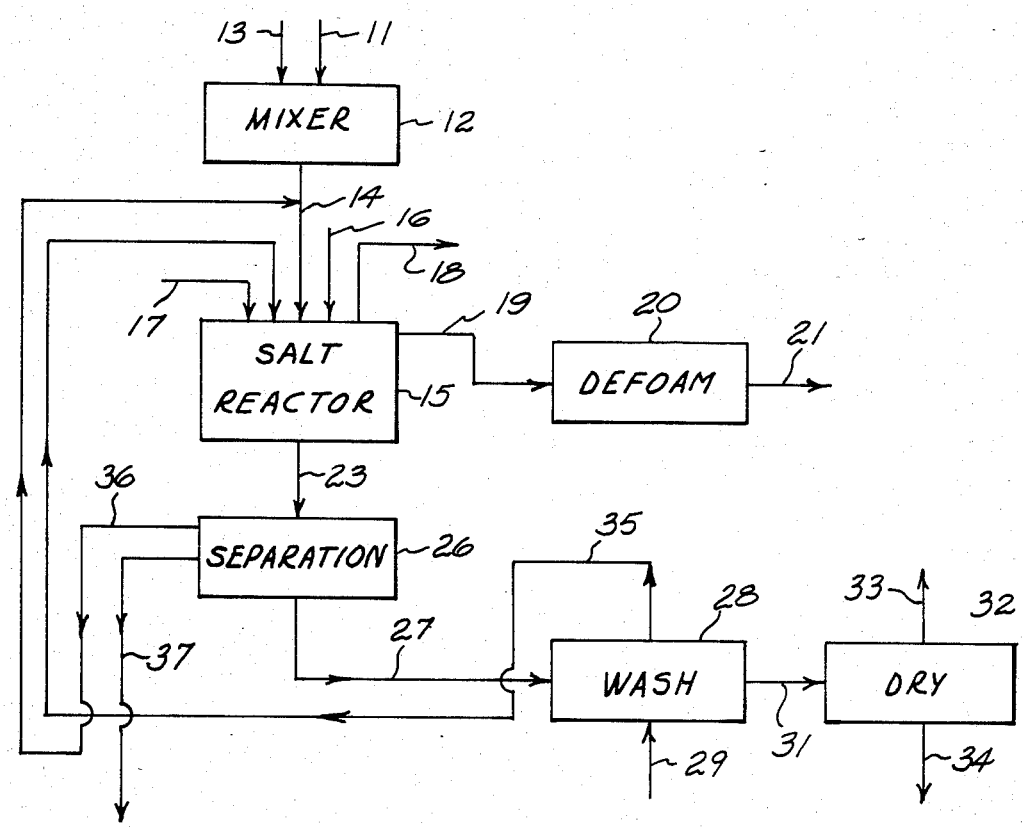
FIG. 1 is a schematic flowsheet of a first method of performing the process of the present invention.

Referring now to FIG. 1, iron chloride wastes from a titanium ore chlorinator in line 11 are fed to mixer 12. Pulverized limestone in line 13 is also fed to the mixer 12. From mixer 12 the iron chloride wastes and limestone are fed via line 14 to molten salt reactor 15 containing $CaCl_2 \cdot xH_2O$ wherein the iron chloride is converted to iron oxide and the limestone to calcium chloride. Air is fed to molten salt reactor 15 via line 16 and defoamer via line 17. Carbon dioxide and water vapor are removed from molten salt reactor 15 via line 18. The surface of the molten salt in reactor 15 is skimmed and the resulting impurities such as coke and a small amount of $CaCl_2 \cdot xH_2O$ are removed via line 19 and sent to unit 20 where defoaming action is performed. The $CaCl_2 \cdot xH_2O$-impregnated coke is removed from unit 20 via line 21 and disposed of. The reaction products from molten salt reactor 15 are removed via line 23 and sent to sedimentation or centrifuging separation unit 26. The titanium ore which settles to the bottom of sedimentation or centrifuging separation unit 26 is removed via line 27 and sent to washing unit 28. Wash water is fed to washing unit 28 via line 29. Washed titanium ore is removed from washing unit 28 via line 31 and sent to drier 32. Water vapor is removed from drier 32 via line 33 and titanium ore via line 34. Water is removed from washing unit 28 and sent to molten salt reactor 15 as make-up water via line 35. Recycle $CaCl_2 \cdot xH_2O$ is removed from sedimentation or centrifuging separation unit 26 via line 36 and recycled to molten salt reactor 15. A mixture of $CaCl_2 \cdot xH_2O$ and iron oxide composed of approximately 70-80% $CaCl_2 \cdot xH_2O$ and 20-30% $FeO_Y$ where Y is 1-1.5, is removed from sedimentation or centrifuging separation unit 26 via line 37 and disposed of.

Figure 2:
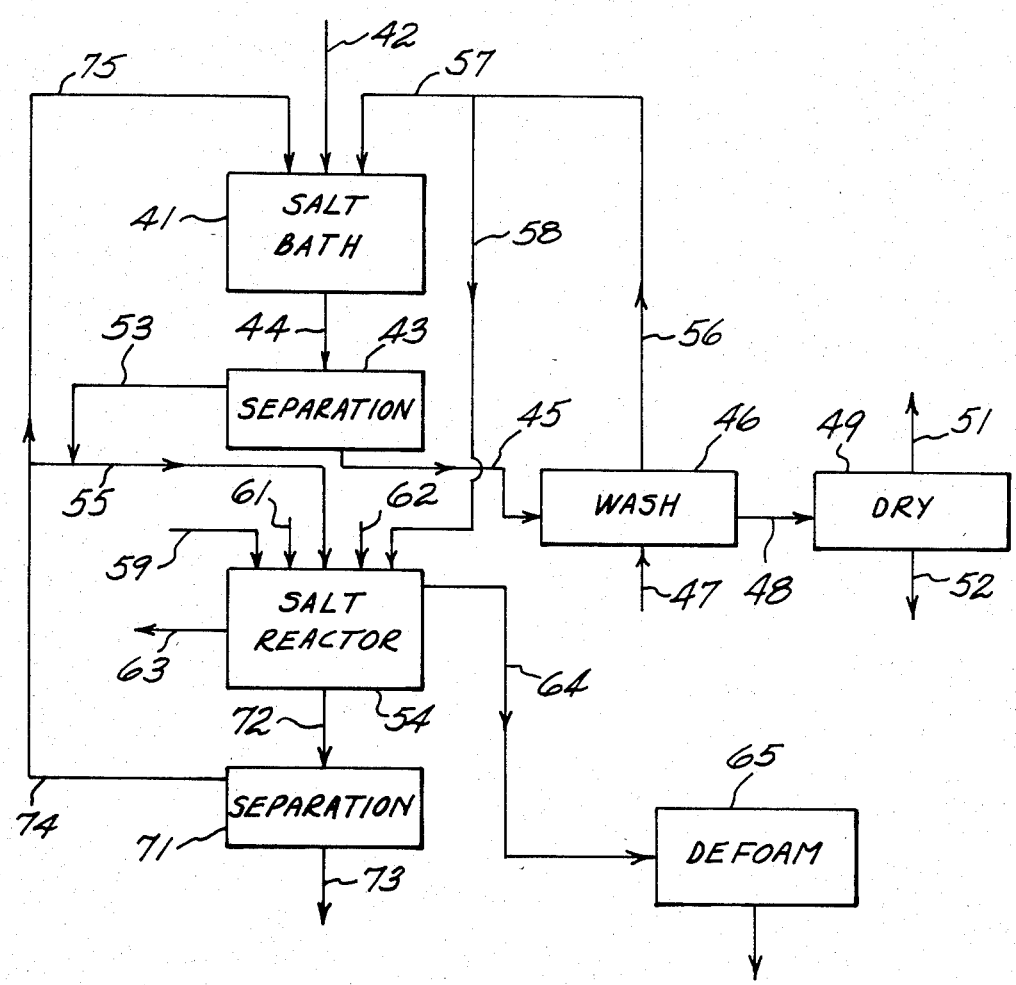
FIG. 2 is a schematic flowsheet of a second method of performing the process of the present invention.

Referring now to FIG. 2, iron chloride wastes from a titanium ore chlorinator are fed to molten salt bath 41 containing $CaCl_2 \cdot xH_2O$ at 50°-200° C. via line 42. The molten salt and iron chloride wastes are fed from molten salt bath 41 to sedimentation unit 43 via line 44. Titanium ore settles in sedimentation unit 43 and is removed in line 45 and sent to washer 46. Wash water is fed to washer 46 via line 47. Washed titanium ore is removed from washer 46 via line 48 and sent to drier 49. Water vapor is removed from drier 49 via line 51 and washed and dried titanium ore is recovered via line 52 and returned to a chlorination unit (not shown). Molten salt and entrained and/or dissolved iron chloride is removed from sedimentation unit 43 via 53 and sent to molten salt reactor 54 via line 55. Water is removed from washer 46 via line 56 and sent to molten salt bath 41 via line 57 and to molten salt reactor 54 via line 58 as make-up water. Limestone is fed to molten salt reactor 54 via line 59. Defoamer is fed to molten salt reactor 54 via line 61. Air is fed to molten salt reactor via line 62. Carbon dioxide and water vapor are removed from molten salt reactor via line 63. Molten salt reactor is fitted with a skimmer which feeds line 64 with coke and molten salt. The molten salt and coke are defoamed and condensed in unit 65. Molten salt and iron oxide are sent from molten salt reactor 54 to sedimentation unit 71 via line 72. Molten $CaCl_2 \cdot xH_2O$ and entrained iron oxide are removed from the bottom of sedimentation unit 71 via line 73 and disposed of. Molten salt is removed from sedimentation unit 71 via 74 and recycled to molten salt reactor 54 via line 55 and to molten salt bath 41 via line 75.

DETAILED DESCRIPTION

The present invention involves the discovery that the iron chloride wastes from a titanium dioxide ore chlorinator can be treated or neutralized with limestone at a modest temperature in a molten salt reactor. The reaction is fast and generates a great deal of carbon dioxide. This generation of carbon dioxide combined with elevated temperature serves to strip water from the system and thus maintain the desired water content in the system as well as to agitate the reaction mixture. Any water deficiency in the system is corrected with make-up water. Generally the temperature is in the range of from about 50°-200° C. with 100°-150° C. being preferred. The molten salt used in the process of the invention is $CaCl_2 \cdot xH_2O$ where x is between 3 and 6 and more preferably between 4 and 5. The case where x=3 is in reality a mixture of $CaCl \cdot 2H_2O$ and $CaCl_2 \cdot 4H_2O$. The amount of water of hydration is important because it controls the melting range (without boiling) of the salt which, in turn affects the reaction rate and the viscosity of the melt. The process minimizes the pressure needed to prevent boiling, at the required reaction temperature, but does not exclude pressurization if still higher temperatures are desired.

The low pressure afforded by the present invention facilitates removal of the gaseous $CO_2$ which is generated by the reaction and thus avoids suppression of the reaction which can be caused by the use of pressure required when using an aqueous system at near and/or beyond the boiling point of water.

The reactions are generally fast with over half the reactions being sufficiently complete in less than 10 minutes for the ferric system for the product to be landfilled. In the process of the present invention, ferric chloride reacts fast even at temperatures as low as 110° C. Ferrous chloride reacts slower and requires a temperature of about 150° C. to reach a significant rate but is rendered land-fillable rapidly at lower temperatures when reacted with calcium carbonate in admixture with ferric chloride. Most of the other trace metal chlorides commonly associated with the iron chlorides waste from a titanium ore chlorinator will also be neutralized along with the iron chlorides. The iron chlorides and the other trace metal chlorides appear to first dissolve in the molten salt followed by adsorption, $CaCO_3$ dissociation, and finally neutralization. Representative reactions which occur can be summarized as follows:

$$CaCO_3 + FeCl_2 \rightarrow FeO + CaCl_2 + CO_2 \uparrow$$

$$3FeO + \tfrac{1}{2}O_2 \rightarrow Fe_3O_4 (\text{if } O_2 \text{ is present})$$

$$3CaCO_3 + 2FeCl_3 \rightarrow Fe_2O_3 + 3CaCl_2 + 3CO_2 \uparrow$$

The process of the present invention offers numerous advantages over the dry lime (CaO) neutralization process. First the low-temperature and atmospheric-pressure operation simplifies material handling, storage and reactor design. The process allows recovery of blowover coke and titanium ore, which are entrained in the chlorination gases, either before or after the neutralization reaction. The process allows 100% use of limestone which would otherwise require an energy intensive calcination temperature in excess of 500° C. to produce CaO which has to be handled and stored dry. Further, the high temperatures promote the production of more soluble forms of some impurities such as chromium and manganese. The limestone neutralization also avoids the danger of any high-temperature runaway reaction, such as the reaction between $FeCl_3$ and CaO as well as any hydrogen gas hazard which is characteristically associated with the lime-neutralization at high temperatures. The $CaCl_2 \cdot xH_2O$ molten salt is nonhazardous. Another advantage of the process is that no external source of molten salt is needed because the molten salt is also one of the major reaction products, which is recycled to the reactor.

Surprisingly the product produced by the present invention is a stable, nonleaching material which is less water permeable than clay when handled properly. The product of the present invention sets up when placed in a land-fill and is impermeable to water even if some ferrous chloride is present. The fact that the product is nonleaching and impermeable to water is surprising, because of the presence of a large amount of calcium chloride which is very soluble in water. The material appears to set up in a manner somewhat analogous to cement setting up, but the set up material is not strong enough to use as a structural substitute for cement.

The self-sealing product is obtained when the molten, melt-neutralized material is poured into a test tube or landfill providing:

1. That the starting material $FeCl_3/FeCl_2$, contains at least about 10% by weight $FeCl_3$, and
2. The $FeO_Y$, where Y equals 1.0–1.5, in admixture with $CaCl_2$, has been concentrated to a weight ratio of $CaCl_2 \cdot xH_2O$ (calculated as $CaCl_2 \cdot 2H_2O$)/$FeO_Y$ of from 1/9 to 4/1 preferably about $\tfrac{1}{2}$.

The samples produced from pure $FeCl_2$ starting material never sealed under any circumstances.

The concentration of $FeO_Y$ in the molten salt can be achieved by either settling or centrifuging.

The self-sealing property can also be achieved by first dehydrating the melt-neutralized product from $CaCl_2 \cdot 4H_2O$ to $CaCl_2 \cdot 2H_2O$ by heating at about 200° C. followed by wetting with water shortly before packing or landfilling.

EXAMPLES

EXAMPLE 1

Calcium chloride hydrate containing two molecules of hydration (147 g) is mixed with 36 g of water in a three-necked 1000 ml flask equipped with a stirrer, thermometer and gas connections. After hardening, the contents of the flask are heated to 125° C. with stirring. Fifteen grams of calcium carbonate are mixed with 21.35 g of $FeCl_3$ and added to the flask. After 2 minutes 10 ml of water containing 0.5 ml antifoam agent are added to the flask. Nitrogen gas is passed through the flask at a rate of 750 ml/minute as measured at standard temperature and pressure. Samples of off-gas from the flask are taken at 130° C. and analyzed for carbon dioxide with the results reported in Table I. The production of $CO_2$ is an indication of the rate of reaction, thus in 15 minutes the reaction was essentially complete.

TABLE I

| Time Minutes | $CO_2$ % |
|---|---|
| 1 | 27.57 |
| 3 | 22.06 |
| 6 | 8.30 |
| 10 | 3.13 |
| 15 | 0.45 |
| 20 | 0.12 |
| 30 | 0.02 |

EXAMPLE 2

Example 1 is repeated except the flask is heated to 150° C. before adding the calcium carbonate and ferric chloride and 22.5 g of calcium carbonate are added to the flask. Twenty-six minutes into the sampling time the material in the flask has thickened to a paste and 10 ml of water are added. The results of the off-gas sampling are reported in Table II.

TABLE II

| Time | Temperature °C. | $CO_2$ % |
|---|---|---|
| 35 sec | 140 | 42.78 |
| 1 min, 45 sec | 140 | 28.97 |
| 4 min | 145 | 17.27 |
| 7 min | 148 | 9.70 |
| 10 min | 146 | 3.74 |
| 21 min | 155 | 2.25 |
| 30 min |  | 1.29 |

EXAMPLE 3

Example 1 is repeated except that the flask is heated to 110° C. before the ferric chloride and calcium carbonate are added to the flask and that 40.14 g of calcium carbonate was added to the flask. The analyses of the off-gas from the flask are separated in Table III.

TABLE III

| Time | Temperature °C. | $CO_2$ % |
|---|---|---|
| 55 sec | 111 | 42.94 |
| 1 min, 55 sec | 112 | 29.54 |
| 5 min. | — | 21.92 |
| 10 min | 115 | 3.99 |
| 15 min | 114 | 2.41 |
| 20 min | 113 | 1.19 |
| 30 min | 110 | 0.68 |

EXAMPLE 4

Example 3 is repeated except the contents of the flask are heated to 130° C. before adding the ferric chloride and calcium carbonate. The analyses of the off-gas from the flask are reported in Table IV.

TABLE IV

| Time | Temperature °C. | $CO_2$ % |
|---|---|---|
| 50 sec | 125 | 40.23 |
| 2 min | 125 | 26.07 |
| 5 min | 127 | 21.12 |
| 10 min | 131 | 5.68 |
| 15 min | 130 | 3.49 |
| 20 min | 127 | 1.55 |
| 30 min | 130 | 0.69 |

EXAMPLE 5

Figure 3:
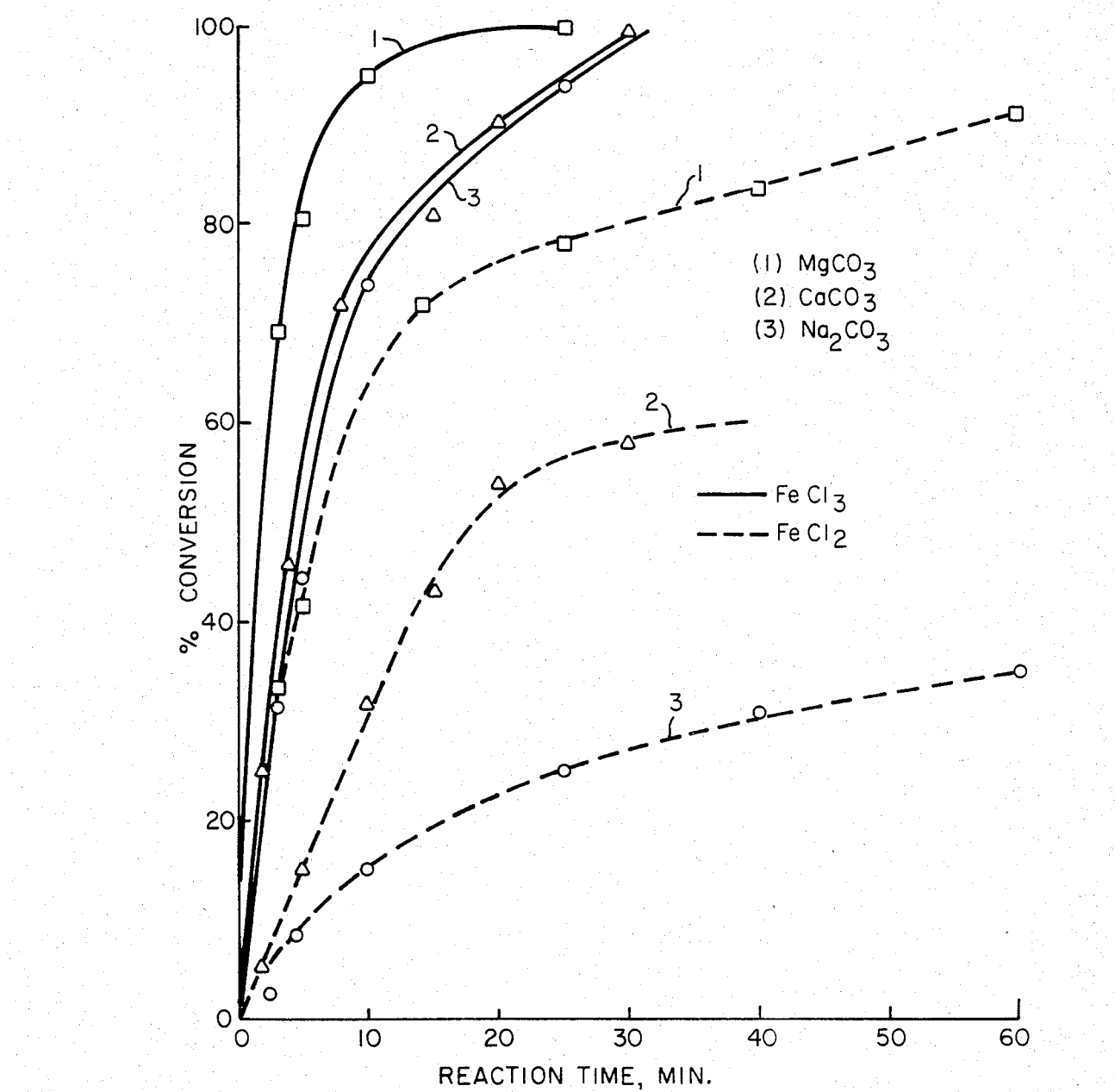
FIG. 3 is a plot of % conversion vs. reaction time as described in Examples 5-10.

Calcium chloride hydrate containing two molecules of hydration (147.0 g) is mixed with 36.0 g of water in a three-necked, 1000 ml flask equipped with a stirrer, thermometer and gas connections. The water reacts with the $CaCl_2.2H_2O$ to form $CaCl_2.4H_2O$ which forms as a hard solid. The contents of the flask are heated to 145° C. with continuous stirring until the molten $CaCl_2.4H_2O$ salt is water-like. A stoichiometric mixture of $FeCl_2$ and $CaCO_3$ powder is added to the melt in the flask. The initial mole ratio of $CaCl_2.4H_2O/(FeCl_2 + CaCO_3)$ is 1.0/0.4. After about two minutes, 10 ml of water containing 0.5 ml antifoam agent are added to the flask. Air is bubbled through the flask at a rate of 750 ml/minute as measured at standard temperature and pressure. A reflux condenser is fitted to the exit neck of the flask, thereby minimizing the loss of $H_2O$ from the flask. Samples of the off-gas from the flask are taken periodically and analyzed for carbon dioxide content at selected intervals of time, the results of which are reported as broken line curve (2) in FIG. 3.

EXAMPLE 6

Example 5 is repeated except that an equimolar amount of magnesium carbonate is substituted for the calcium carbonate. The results are reported as broken line curve (1) in FIG. 3. As can be seen from FIG. 3, magnesium carbonate exhibits a faster reaction role than calcium carbonate.

EXAMPLE 7

Example 5 is repeated except that an equimolar amount of sodium carbonate is substituted for the calcium carbonate. The results are reported as broken line curve (3) in FIG. 3. As can be seen, the sodium carbonate is less reactive than the calcium carbonate.

EXAMPLE 8

Example 5 is repeated except that an equimolar amount of ferric chloride is substituted for the ferros chloride. The results are reported as solid line curve (2) in FIG. 3.

EXAMPLE 9

Example 5 is repeated except an equimolar amount of magnesium carbonate is substituted for the calcium carbonate and an equimolar amount of ferric chloride is substituted for the ferrous chloride. The results are reported as solid line curve (1) in FIG. 3. As can be seen the magnesium carbonate is more reactive than the calcium carbonate.

EXAMPLE 10

Example 5 is repeated except an equimolar amount of sodium carbonate is substituted for the calcium carbonate and an equimolar amount of ferric chloride is substituted for the ferrous chloride. The results are reported as solid line curve (3) in FIG. 3. As can be seen the sodium carbonate is less reactive than the calcium carbonate.

EXAMPLE 11

Example 5 is repeated except an equimolar amount of an equimolar mixture of ferric chloride and ferrous chloride is substituted for the ferrous chloride. The results are reported as line (1) in FIG. 4.

EXAMPLE 12

Example 5 is repeated except an equimolar amount of an equimolar mixture of ferric chloride and ferrous chloride is substituted for the ferrous chloride and an equimolar amount of magnesium carbonate is substituted for the calcium carbonate. The results are reported as line (2) in FIG. 4. Again the magnesium carbonate is more reactive than the calcium carbonate.

EXAMPLE 13

Example 5 is repeated except that an equimolar amount of an equimolar mixture of ferric chloride and ferrous chloride is substituted for the ferrous chloride and an equimolar amount of sodium carbonate is substituted for the calcium carbonate. The results are reported as curve (3) in FIG. 4. Again the sodium carbonate is less reactive than the calcium carbonate.

EXAMPLES 14–16

Example 5 is repeated except 40.0 g of a mixture of solid chloride waste from a titanium ore chlorinator is added to the molten $CaCl_2.4H_2O$ in the flask. After one hour of reaction, the molten mass is centrifuged at 1,840 rpm in a laboratory bench-top centrifuge heated to 150° C. After ten minutes of centrifuging, the supernatant molten salt is poured out of the centrifuge tubes. The solidified reddish mass in the bottom layer comprises approximately 30 weight percent iron oxides and 70 weight percent $CaCl_2.xH_2O$. This solid mass is pulverized and subjected to the Environment Protection Agency's E.P. Toxicity leaching test and analysis as reported in the Federal Register V. 45 No. 98, May 18, 1980 pp. 33122, 33127–33128. Although chromium and especially chromium in the hexavalent state are of major concern in the titanium ore chlorinator solid waste materials tested, due to their being one of the eight elements listed by E.P.A. for the regulation of hazardous waste solids, Fe, Mn and V are also analyzed to determine the extent of insolubilization of each element as a result of the treatment. Titanium ore chlorinator solid waste from two plants A and B are tested. The data are summarized in Table V. In Table V Mg stands for milligrams, and ND stands for not detectable.

EXAMPLE 17

Example 17 reports the result of dry-lime neutralizing the wastes from plant B using CaO which reacts spontaneously with iron chloride when a small amount of water is sprayed onto the solid mixture.

TABLE V

| | Waste From | Fe | | Mn | | V | | Cr-Total | | $Cr^{VI}$ | |
|---|---|---|---|---|---|---|---|---|---|---|---|
| Ex | Plant | mg/l | Insolubilized % | mg/l | Insolubilized % | mg/l | Insolubilized % | mg/l | Insolubilized % | mg/l | Insolubilized % |
| 14 | A | 159 | 98.1 | 88.1 | 50.0 | 0.986 | 99.2 | 0.366 | 99.4 | ND | 100 |
| 15 | A | 229 | 97.2 | 65.0 | 50.0 | — | — | 0.53 | 99.1 | 0.1 | 100 |
| 16 | B | 678 | 95.1 | 36.8 | 90.1 | 0.841 | 99.2 | 0.224 | 99.5 | ND | 100 |
| 17 | B | 771 | 94.8 | 109.0 | 70.5 | — | — | 8.40 | 82.3 | 2.1 | — |

As can be seen in Table V, chromium, chromium in the hexavalent state, vanadium and iron are all nearly completely reacted and insolubilized. Manganese is the only one which is only partially (50–90%) insolubilized.

EXAMPLE 18

Numerous $CaCO_3$ melt-neutralized iron chloride samples are tested in the laboratory for permeability under a two foot head of water. A sample of the permeability test data is presented in Table VI. Table VI also serves as a summary of the experimental findings for achieving water impermeability of the neutralized products. The following are the conclusions based on the test data.

The method of dampening the product before packing it into a permeability test tube does not produce impermeability with the melt-neutralized product.

Charging the molten, melt-neutralized sample into the permeability test tube can produce a self-sealing product under the conditions as follows:

The starting material has to contain >10% by weight $FeCl_3$. Samples produced with pure $FeCl_2$ never did seal under any circumstances.

Samples produced from either pure $FeCl_3$ or $FeCl_3$/$FeCl_2$ mixture sealed very well so long as the $FeO_y$ had been concentrated to about 20–90%, preferably 30% by weight. The concentration of $FeO_y$ can be achieved by either settling or centrifuging.

Both A and B plant samples, after neutralization and centrifuging, yielded self-sealing products.

Self-sealing property can also be achieved by first dehydrating the melt-neutralized product from tetra- to di-hydrate at 200° C. followed by wetting with $H_2O$ shortly before packing.

TABLE VI

Permeability Test of the $CaCO_3$ Melt-Neutralized FeCl
(Samples Packed When Still Molten)

| Run No. | Reactants Compound | Gr-Mole | Product Centrifuge* | Time (Days) | Permeation (lbs/ft²-day) |
|---|---|---|---|---|---|
| 36 | $Fe_2O_3$ | — | — | 250 | 0 |
| | $CaCl_2\ 2H_2O$ | — | — | | 0 |
| 42 | $FeCl_2$ | 0.15 | No | 128 | 38.4 |
| | $CaCO_3$ | 0.15 | | | |
| 40 | $FeCl_2$ | 0.15 | Yes | 134 | 31.2 |
| | $CaCO_3$ | 0.15 | | | |
| 43 | $FeCl_3$ | 0.15 | No | \multicolumn{2}{l}{($CaCl_2$ was washed out of the 6" column in 20 days)} |
| | $CaCO_3$ | 0.225 | | | |
| 44 | $FeCl_3$ | 0.15 | Yes | 127 | 0 |
| | $CaCO_3$ | 0.225 | | 127 | |
| 35 | $FeCl_3$ | 0.075 | No | 250 | 2.1 |
| | $FeCl_2$ | 0.075 | | 250 | |
| | $CaCO_3$ | 0.188 | | 250 | |
| 45 | $FeCl_3$ | 0.075 | Yes | 126 | 0 |
| | $FeCl_2$ | 0.075 | | | |
| | $CaCO_3$ | 0.188 | | | |
| 48 | A** | 25.0 gr | Yes | 119 | 0 |
| | $CaCO_3$ | 15.0 gr | | | |
| 49 | B** | 25.0 gr | Yes | 119 | 0 |
| | $CaCO_3$ | 15.0 gr | | | |

Reaction conditions: 150° C., 60 min., 750 ml/min. $O_2$ flow, $CaCl_2$ .4$H_2O$, melt-100 gr-mole.
*After 10 minutes of centrifuging and the removal of supernatant molten salt, the remaining solids comprise approximately 20–40% iron oxides and 60–80% $CaCl_2$ $XH_2O$.
**A and B are $TiO_2$ chlorinator chloride solid waste from two different sources.

What is claimed is:

1. A process of treating with limestone iron chloride wastes generated in an ore chlorination wherein the treatment reaction is carried out at from about 50° C. to about 200° C. in a molten bath of $CaCl_2.xH_2O$ wherein x is from 3-6 to form a mixture of iron oxide and calcium chloride hydrate.

2. The process of claim 1 wherein the treating reaction is carried out at from 100°–150° C.

3. The process of claim 2 wherein x is from 4-5.

4. The process of claim 3 wherein the iron chloride is a waste from a titanium ore chlorination operation.

5. The process of claim 4 wherein calcium chloride formed in the neutralization reaction is separated from the iron oxides and recycled to form the molten $CaCl_2.xH_2O$ bath.

6. The process of claim 1 wherein the unreacted titanium ore characteristically contained in the iron chloride wastes is recovered through sedimentation and washing with water.

7. The process of claim 1 wherein calcium chloride formed in the neutralization reaction is separated from the iron oxides and recycled to form the molten $CaCl_2.xH_2O$ bath.

* * * * *